United States Patent
Johnston

(10) Patent No.: US 9,503,263 B2
(45) Date of Patent: Nov. 22, 2016

(54) METHOD AND APPARATUS FOR STORING ENCRYPTED DATA FILES ACROSS DISTRIBUTED STORAGE MEDIA

(71) Applicant: DYCE, LLC, Stevenson, MD (US)

(72) Inventor: Anna M. Johnston, Vancouver, WA (US)

(73) Assignee: DYCE, LLC, Stevenson, MD (US)

( * ) Notice: Subject to any disclaimer, the term of this patent is extended or adjusted under 35 U.S.C. 154(b) by 0 days.

(21) Appl. No.: 14/515,833

(22) Filed: Oct. 16, 2014

(65) Prior Publication Data

US 2016/0112197 A1     Apr. 21, 2016

(51) Int. Cl.
| H04L 9/32 | (2006.01) |
| H04L 9/30 | (2006.01) |
| H04L 9/08 | (2006.01) |

(52) U.S. Cl.
CPC ........... *H04L 9/3093* (2013.01); *H04L 9/0869* (2013.01); *H04L 2209/24* (2013.01)

(58) Field of Classification Search
CPC ........... H04L 19/3093; H04L 19/0869; H04L 2209/24
USPC ......................................................... 713/168
See application file for complete search history.

(56) References Cited

U.S. PATENT DOCUMENTS

| 2010/0091986 A1* | 4/2010 | Wakayama | G06F 21/6209 380/44 |
| 2012/0278622 A1* | 11/2012 | Lesavich | G06F 17/30864 713/168 |
| 2014/0185794 A1* | 7/2014 | Yasuda | H04L 9/008 380/28 |
| 2014/0359276 A1* | 12/2014 | Resch | H04L 63/0457 713/153 |

* cited by examiner

*Primary Examiner* — Saleh Najjar
*Assistant Examiner* — Feliciano Mejia
(74) *Attorney, Agent, or Firm* — Smyrski Law Group, A.P.C.

(57) ABSTRACT

A method for distributing data to a plurality of storage locations in a computing network is provided. The method includes receiving, at a processor in the computing network, input data and an input random cryptovariable, transforming, at the processor, the input data and the input random cryptovariable into encrypted output using Da Yen processing, and distributing the encrypted output to the plurality of storage locations. The present design further includes a method for decrypting encrypted blocks of data distributed over a plurality of storage locations in a computing network. The method includes receiving, at a processor in the computing network, a plurality of cipher/key word pairs, and transforming, at the processor, the plurality of cipher/key word pairs and a salt key word into plaintext using Da Yen processing.

22 Claims, 8 Drawing Sheets

METHOD AND APPARATUS FOR STORING ENCRYPTED DATA FILES ACROSS DISTRIBUTED STORAGE MEDIA

BACKGROUND

I. Field

The present disclosure relates generally to the field of data storage, and more specifically to storage of data across multiple diverse storage systems.

II. Description of the Related Art

Current storage on the Internet generally entails storage of a particular set of data, such as a file, on a single site. Distributed storage reduces costs while increasing productivity with respect to the data. In certain instances, users or computer applications may seek to perform a function involving a file distributed in multiple locations, such as searching the file for information. For example, a file may be distributed in multiple locations and the user may wish to search the file for the term "Tuesday." Such functionality over distributed data has been difficult or impossible in the past, generally limited to retrieving the file components, combining the file components into the file, and then performing the desired function, such as a text search function, on the retrieved and reconstructed file. Such operations take time and tend to be computationally inefficient.

Coupled with the difficulty of performing functions on distributed file components, security and privacy risks are also problematic in cloud based storage solutions. Conventional cryptography maps a block of data to a block of data based on a secret key, such as AES mapping 128 bits to 128 bits. Given access to the 128 encrypted bits, then compromising the secret key to the data compromises the data, i.e. once the key is lost, all of the data is lost that has been encrypted according to that key. It would be advantageous for security if the encrypted data were split apart and distributed in such a manner that access to any one or possibly several of the parts did not compromise the data even if the secret key was completely compromised.

Also, certain advantages exist with functions that are homomorphic. However, conventional encryption is frequently not homomorphic, and operations on, for example, plaintext data are not possible when such text is in encrypted form. Homomorphic encryption entails performing specific computations on ciphertext (encrypted text) and generating an encrypted result that, when decrypted, matches the results of operations performed on plaintext (unencrypted text, i.e. the original text). Thus, for example, searching can be performed on encrypted data that has been homomorphically encrypted without the need to collect all the encrypted data and decrypt the data. This goes for other operations as well. One drawback to homomorphic encryption is that homomorphic encryption algorithms that do exist tend to be costly, complex, and in certain instances not truly homomorphic.

A computing system configured to distribute portions of files such that all the distributed pieces are not necessary to reconstruct the file would be highly desirable, particularly in instances where some of the distributed pieces may be lost, destroyed or damaged. Thus a computing system configured to distribute portions of files that enables performing data functions on distributed file pieces would be highly desirable, particularly if such files have adequate security, encryption is homomorphic, and the ability to perform functions on the encrypted distributed data is not excessively computationally expensive.

SUMMARY

According to the present design, there is provided a method for distributing data to a plurality of storage locations in a computing network. The method includes receiving, at a processor in the computing network, input data and an input random cryptovariable, transforming, at the processor, the input data and the input random cryptovariable into encrypted output using Da Yen processing, and distributing the encrypted output to the plurality of storage locations.

Alternately, the present design may include an apparatus for distributing data to a plurality of storage locations in a computing network. The apparatus includes a processor configured to receive input data and an input random cryptovariable and transform the input data and the input random cryptovariable into encrypted output using Da Yen processing. The apparatus further includes a transmitter configured to receive the encrypted output and distribute the encrypted output to the plurality of storage locations.

The present design may also include a method for decrypting encrypted blocks of data distributed over a plurality of storage locations in a computing network. The method includes receiving, at a processor in the computing network, a plurality of cipher/key word pairs, and transforming, at the processor, the plurality of cipher/key word pairs and a salt key word into plaintext using Da Yen processing.

Various aspects and features of the disclosure are described in further detail below.

DETAILED DESCRIPTION

Figure 1:
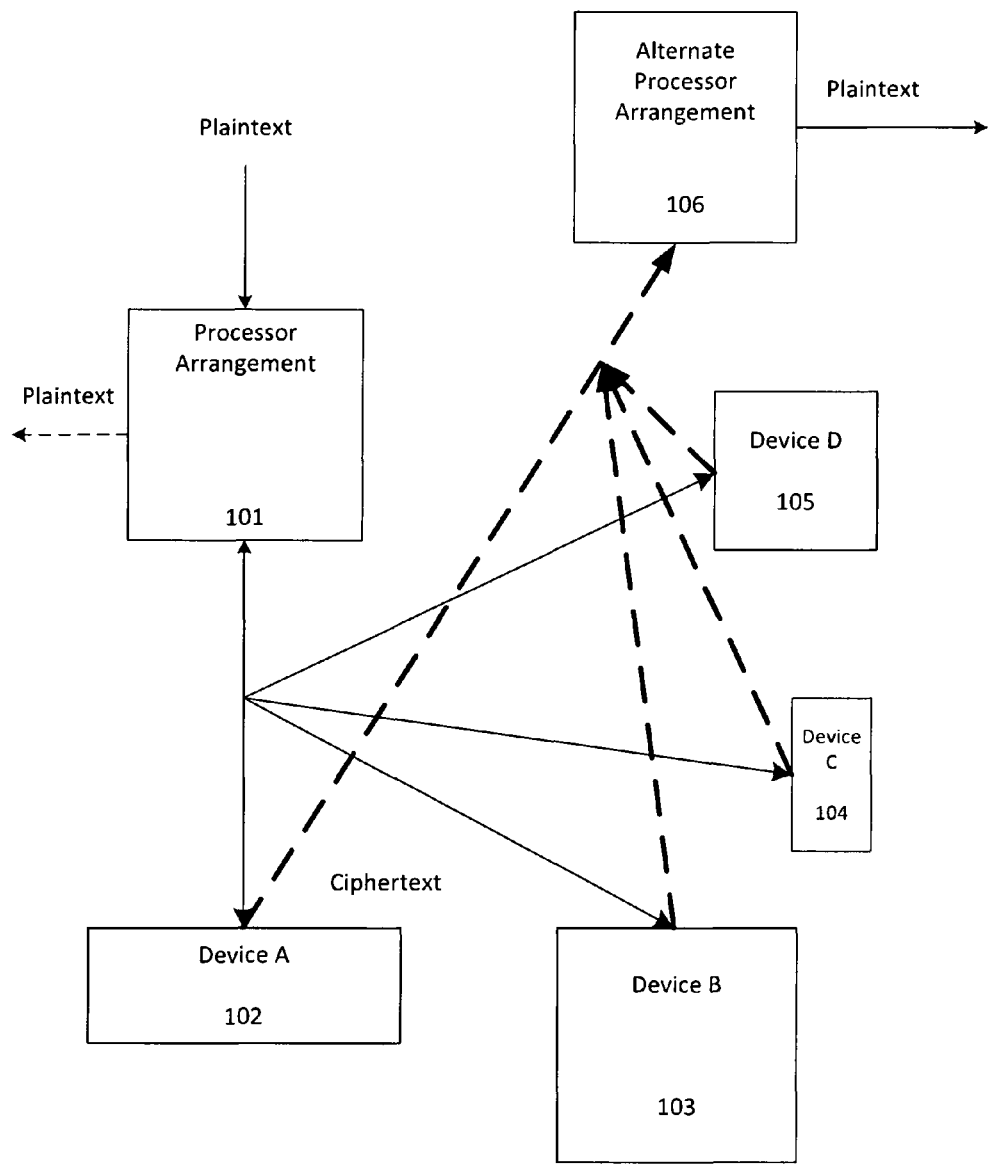
FIG. 1 illustrates a general overview of one embodiment of the present design.

The techniques described herein may be used for various computing devices including but not limited to computer networks, interconnected servers, and/or the "cloud," and certain functionality may be provided with computing devices including but not limited to cellular phones, smartphones, tablets, Bluetooth devices, and virtually any other device that employs data and has computational ability.

The present design is a privacy, security and integrity data distribution solution that complements the distributed nature of cloud computing by using the encryption process to convert data from a single entity into several smaller, independent pieces. On their own these pieces are highly secure: even if the piece of data and the cryptographic key are compromised, no bit of the plaintext data is revealed. Furthermore, the system operates so that some of the ciphertext pieces may be lost without any loss to the original data.

The present design employs Da Yen encryption, where Da Yen translates to the intermediate analysis also known as the Chinese remainder theorem. Da Yen Encryption provides certain benefits over standard block ciphers or the standard use of a stream cipher, i.e., xor-ing (exclusive or-ing) a key stream to plaintext. Da Yen encryption is inherently homomorphic. Partial data sets provide no information about anyone any particular word, providing added security in a cloud scenario where the data can be divided throughout the cloud structure. A system having flexibility in the amount of redundancy used (t words of ciphertext per d words of plaintext) enables recovery of lost or temporarily unavailable data depending on the expected loss or system down time. Flexibility in block size is provided, enabling use with various types of data, e.g. individual data base fields or large video files. Using Da Yen encryption, small database fields may be searched in their encrypted form, while larger data files may be designed with significantly large diffusion.

In general, Da Yen encryption entails starting with a finite field $F_q$, where q is a value such as $2^n$ and field $F_q$. Plaintext is represented as a polynomial over the finite field $F_q$. If the plaintext words are $u_i \in F_q$ for i=0, 1, ... (d-1), the plaintext block is $\{u_{d-1}, u_{d-2}, \ldots, u_0\}$ and the plaintext polynomial is:

$$f(x) \equiv \Sigma_{i=0}^{d-1} u_i x^i \quad (1)$$

with $u_{d-1}$ either zero or only partially filled.

The system employs a standard stream cipher, e.g. a key stream generator, to generate (t+1) key words in $F_q$ where t≥d. Results of the standard stream cipher are $k_0, k_1, \ldots, k_{t-1}, k_t$ where $k_j \in F_q$ and $k_j \neq k_i$ and $k_j \neq 0$ for all i≠j. So that stereotypical data, such as all zeros, have random ciphertext, the system fills high order plaintext word, e.g. word d-1 or a partial salt key word (byte), using one of the following options. Either the system uses the (t)th key word ($k_t$) as the (d-1)-th plaintext coefficient (higher order word) $u_{d-1}=k_t$, or the system uses the first non-zero byte of the (t)-th key word as the high order byte of the (d-1)-th plaintext coefficient, filling in the low order portion of the word with plaintext as follows:

$$u_{d-1}=(k_t \& 0xff) \| \text{plaintext} \quad (2)$$

In the situation where:

$$f(x) \equiv \Sigma_{i=0}^{d-1} u_i x^i \quad (3)$$

Ciphertext is the set of t points, or ciphertext words $\{w_i=f(k_i)|i=0, \ldots t-1\}$. The ciphertext/key word pair $(w_i, k_i)$ represents the element $w_i \mod(x-k_i)$ in the factor ring $F_q[x]/(x-k_i)F_q[x]$. Any d or more of ciphertext/key pairs along with the key word $k_t$ returns the plaintext.

Testing of the process entails combining any (d) or greater cipher/key word pair to create:

$$f'(x) \equiv \Sigma_{i=0}^{d-1} \overline{u_i} x^i \quad (4)$$

If the (d-1)-th word does not have the correct high order byte or word as was fixed above, or the degree is greater than (d-1), an error occurred. If the data passes these tests, the system removes the fixed high order byte/word and returns the plaintext, $\{\overline{u_i}|0 \le i<d\}$, as plaintext.

The system may employ error correction. For example, if the set of d+1 cipherext and associated cryptovariable pairs $\{(w_i, k_i)|0 \le i<d+1\}$ includes one error, the constructed polynomial f'(x) modulo $M(x)=\Pi_{i=0}^d(x-k_i)$ will probably have degree d with an incorrect high order term $u_{d-1}$. If $w_j$ is the cipher word containing an error, $f'(x) \mod M(x)/(x-k_j)$ will have degree d-1 and the correct higher order term.

The system employs this process to convert a plaintext block of d words into a ciphertext set of t words. Any subset d of these words decrypts, while any fewer than d words gives no information about any individual word, only relational information between words. Further, the ciphertext set of t words is homomorphic using the same key words in $F_q$, and processes performed on the plaintext (e.g. searching) can be performed on the ciphertext.

Da Yen encryption is envisioned over $F_{2^n}$ where n is based on the number of bits per word of available processors, e.g. 16, 32, 64, 128, with n greater than or equal to 8. One example employs 32-bit processors using a minimum of four terms in a plaintext block, resulting in an exhaustion cost of approximately $2^{128}$ per block.

Da Yen encryption operates over polynomial rings. If the moduli are the polynomials $m_0, m_1, m_2, \ldots, m_{t-1}$, where M, with $M=\Pi_{i=0}^{t-1} m_i$ and $\gcd(m_i, m_j)=1$ for all i≠j, then the isomorphism maps a mod $M \cong (a_0 \mod m_0, a_1 \mod m_1, a_2 \mod m_2, \ldots, a_{t-1} \mod m_{t-1}$, with $a_i \equiv a \mod m_i$.

The system converts a polynomial a mod M to a direct sum of polynomials $(a_i \mod m_i | 0 \le i<t)$ as follows:

$$a \mod M \cong (a \mod m_0, a \mod m_1, a \mod m_2, \ldots, a \mod m_{t-1}). \quad (5)$$

Two standard formulas are generally used to convert a direct sum of polynomials back to a single large polynomial: the single summation and iterative formulas.

Da Yen Formulas

For a set of equivalences $\{a_i \mod m_i | 0 \le i<t\}$ with $\gcd(m_i, m_j)=1$ for all $0 \le i, j<t$, i≠j and $M=\Pi_{j=0}^{t-1} m_j$, the following Da Yen formulas return a polynomial A such that $A \equiv a_i \mod m_i$ for i=0, 1, ... (t-1).

The single summation Da Yen formula is:

$$A = \Sigma_{i=0}^{t-1}(\Pi_{j \neq i} m_j)[(\Pi_{j \neq i} m_j)^{-1} a_i \mod m_i] \mod(\Pi_{j=0}^{t-1} m_j) \quad (6)$$

The iterative Da Yen formula is:

$$A_0 = a_0 \mod m_0$$

$$A_i = A_{i-1} + (\Pi_{j=0}^{t-1} m_j)[(\Pi_{j=0}^{t-1} m_j)^{-1}(a_i - A_{i-1}) \mod m_i] \quad (7)$$

where $A \equiv A_{t-1} \mod M$.

Da Yen encryption works over polynomial rings. Most often this ring is the polynomial ring over finite fields $F=F_{2^n}$ or on rare occasions $F=F_p$ where p is prime.

Though any polynomial over F can be a modulus, one moduli that may be employed for Da Yen encryption is a degree one monic polynomial:

$$m_i(x)=(x-a) \quad (8)$$

for some a∈F.

FIG. 1 illustrates a general overview of one embodiment of the present design. In the present design, a processor arrangement 101 configured to receive information, such as a set of plaintext, and configured to perform the operations called for herein. While shown as a single device, processor arrangement 101 may comprise more than one processor, e.g. 8, 16, 32, or any number. Once plaintext has been encrypted as disclosed herein, the processor arrangement may provide ciphertext for distribution to one or more, but typically more than one, device(s) 102-105. While four devices are shown, it is to be understood that any number of devices may be provided. These remote devices may be servers or other data storage devices, and redundant data may be provided to different devices. In general, any number of devices 102-105 may be employed, and ciphertext data in any form, including redundant versions of the ciphertext, may be distributed to the devices 102-105. Ciphertext may be maintained at the devices until such time as it is needed, at which time the ciphertext is retrieved from the devices based on a user command or a system command to perform a function on the data.

Ciphertext data is retrieved from the devices 102-105 and the ciphertext retrieved may be incomplete for one reason or another. The available ciphertext may be processed by the same processor arrangement 101 or by a different processor arrangement 106 shown in FIG. 1. The arrowhead shown going back to processor arrangement 101 in FIG. 1 is an optional indication that processor arrangement 101 receives encrypted data and decrypts the encrypted data to plaintext. Assuming processor arrangement 106 processes the retrieved ciphertext, processor arrangement 106 may then decrypt the ciphertext as described herein to plaintext form and may perform a desired function on the available plaintext, such as performing a search on the available plaintext. As noted herein, less than all the ciphertext may be retrieved and nonetheless decrypted and the function performed using the processor arrangement 106 on less than all of the original plaintext data.

Figure 2:
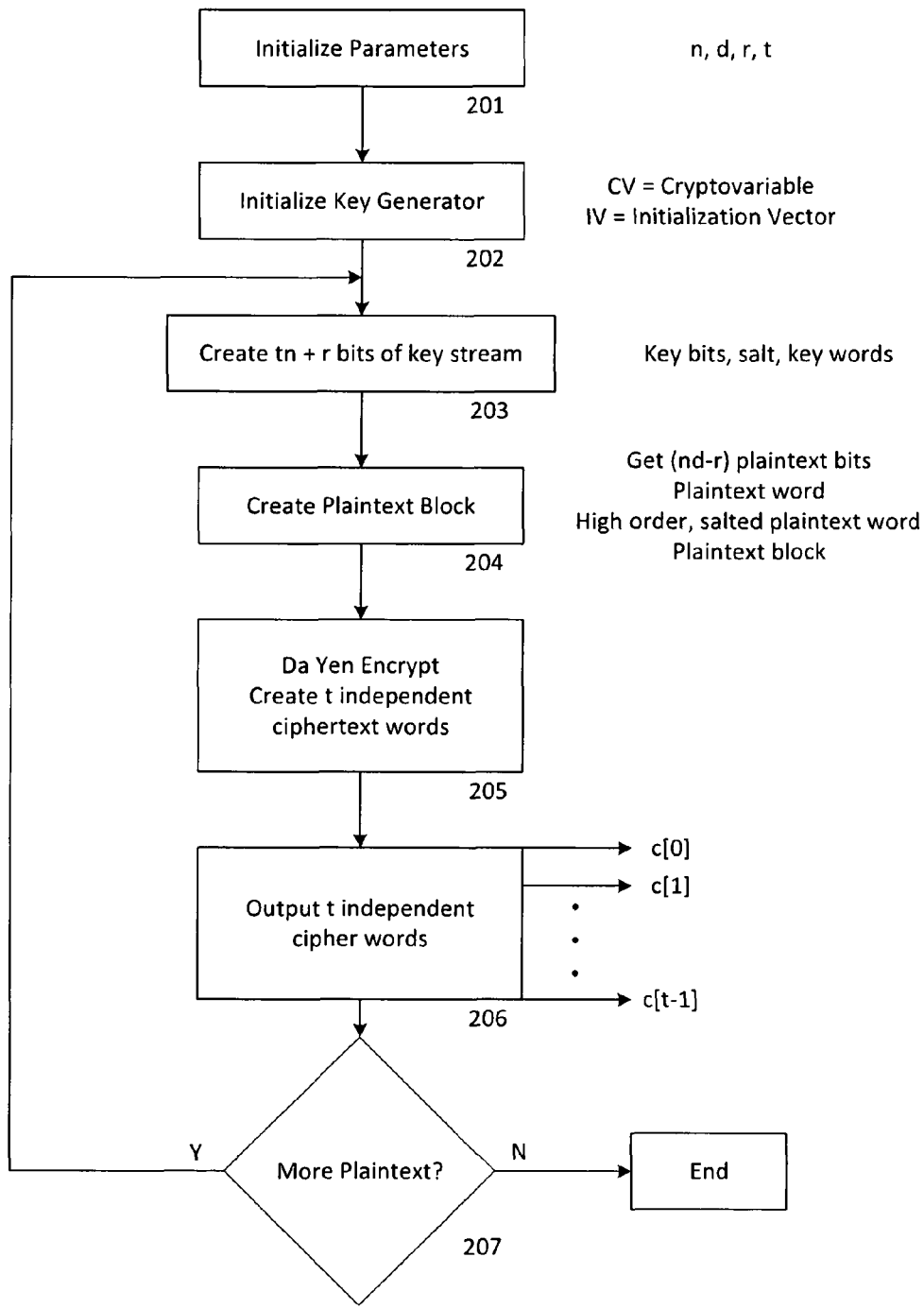
FIG. 2 is a flowchart of the Da Yen encryption process.

FIG. 2 illustrates a flowchart of the encryption process according to the present design. At point 201, the system initializes parameters, including n, the number of bits per plaintext word and ciphertext word, d, the words per plaintext block, r, the number of "salt" bits per plaintext block where r is less than or equal to n, and t, the number of ciphertext words. Salt is understood to be random data used as additional input. Point 202 initializes the key generator, including the cryptovariable and the initialization vector. At point 203, the system creates tn+r bits of the key stream, where the key bits $k_{tn+r-1}, \ldots, k_1, k_0$, the salt is $k_{tn+r-1} \ldots k_{tn}$, and the key words are $k[j]=k_{n(j+1)-1} \ldots k_{nj}$.

Point 204 creates the plaintext block. The system first obtains (nd−r) plaintext bits, $p_{nd-r-1}, \ldots p_1, p_0$, then produces the plaintext word $p[j]=p_{n(j+1)-1} \ldots p_{nj}$ for $0 \leq j < (d-1)$. The system produces the higher order salted plaintext word as $p[d-1]=k_{tn+r-1} \ldots k_{tn}p_{dn-r-1} \ldots p_{n(d-1)}$. The resultant plaintext block is $P=p[d-1] \ldots p[1]p[0]$.

Point 205 is Da Yen encryption, wherein t independent ciphertext words are created. Cipher operations are over the finite field $F_{2^n}$, with $c[j]=\Sigma_{i=0}^{d-1}p[i](k[j])^i$. Point 206 outputs t independent cipher words. At point 207, the system evaluates whether more plaintext is available. If so, the system loops back to point 203 and continues as shown. If no more plaintext is available, the encryption process ends, and a full set of cipher words is available and may be distributed to storage locations as desired or appropriate.

Figure 3:
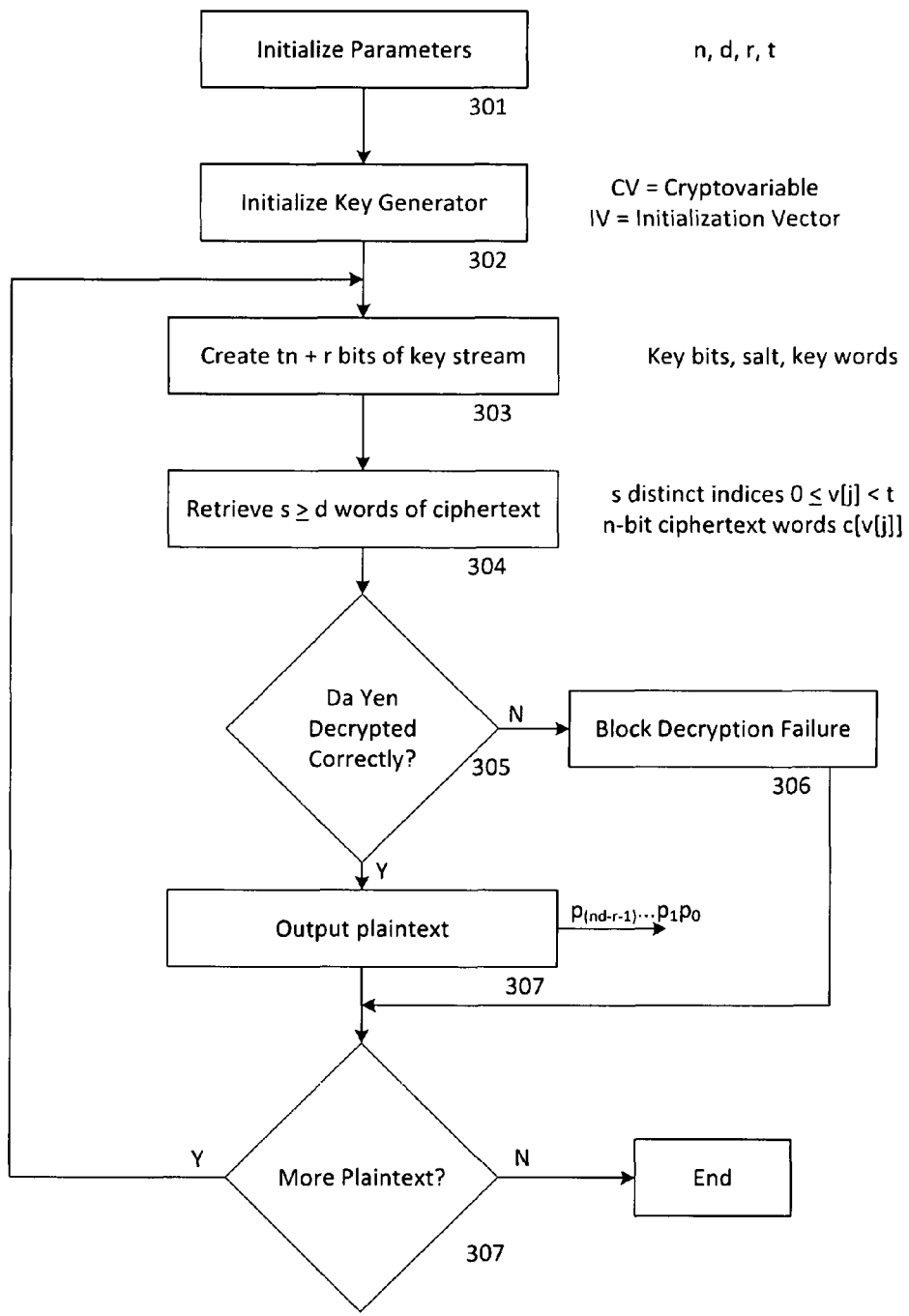
FIG. 3 illustrates a flowchart of decryption using Da Yen processing.

FIG. 3 illustrates the decryption process. From FIG. 3, parameters are initialized at point 301, again including n, the number of bits per plaintext word and ciphertext word, d, the words per plaintext block, r, the number of "salt" bits per plaintext block where r is less than or equal to n, and t, the number of ciphertext words. Point 302 initializes the key generator, including initializing the cryptovariable and the initialization vector. At point 303, the system again creates tn+r bits of the key stream, where the key bits $k_{tn+r-1}, \ldots, k_1, k_0$, the salt is $k_{tn+r-1} \ldots k_{tn}$, and the key words are $k[j]=k_{n(j+1)-1} \ldots k_{nj}$. At point 304, the system retrieves s words of ciphertext, where s is greater than d, s being the distinct indices $0<v[j]<t$ for $j=0, 1, 2, \ldots, (s-1)$ and n-bit ciphertext words $c[v[j]]$ $j=0, 1, 2, \ldots, (s-1)$ are available. d is again the number of words in each plaintext block.

Point 305 evaluates the Da Yen encryption, discussed in detail with respect to FIG. 4 below. If the Da Yen has been correctly decrypted, the system outputs plaintext at point 307. If not, a block decryption failure exists as shown at point 306. A block decryption failure does not result in a transmission for plaintext in most situations. At point 308, the system evaluates whether more plaintext is available. If so, the system cycles back to point 303, otherwise the decryption process ends.

Figure 4:
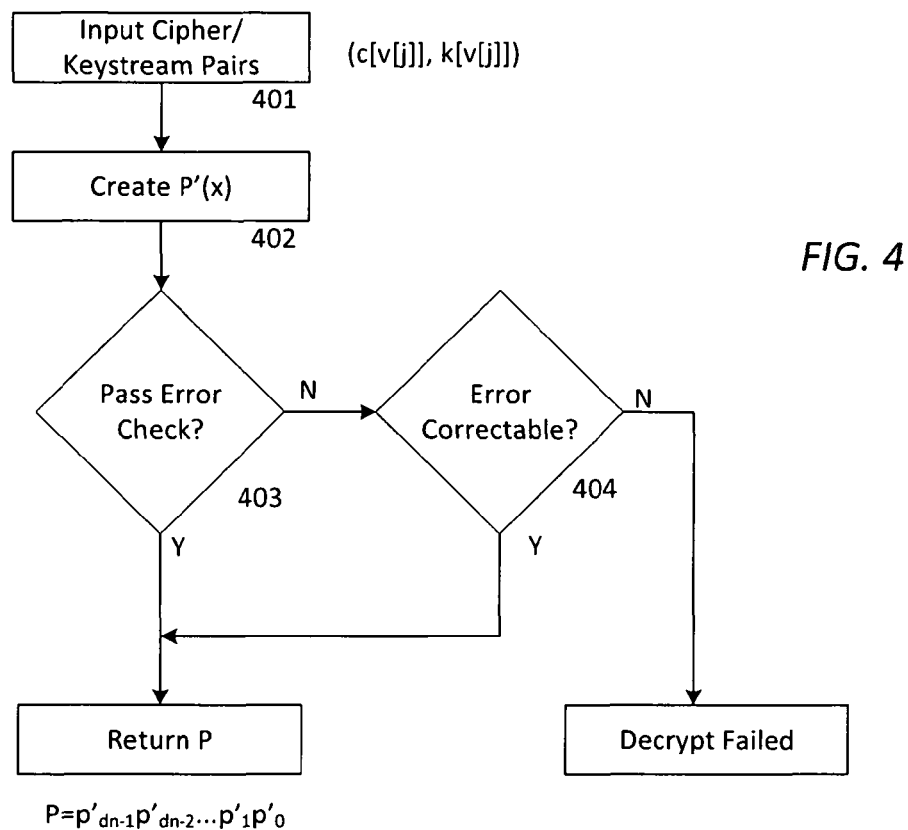
FIG. 4 is the specific Da Yen decryption processing.

FIG. 4 generally illustrates the Da Yen decryption, and represents the evaluation at point 305 in FIG. 3. At point 401, the cipher/keystream pairs are received, including $c[v[j]], k[v[j]], j=0, 1, \ldots, (s-1)$, (c being the cipher and k the keystream). The value of v[j] is less than t and greater than or equal to zero, while the cipher/keystream pair is an element of $F_{2^n}$. At point 402, the system creates P'(x), shown in further detail below. At point 403, the system determines whether an error check has been passed. If not, point 404 determines whether the error is correctable or not. Both points 403 and 404 are discussed in further detail below. If the error is correctable or if the P'(x) value passes the error check, the value of P=P' is returned, representing the decrypted plaintext. If the error is uncorrectable, the decryption fails.

Figure 5:
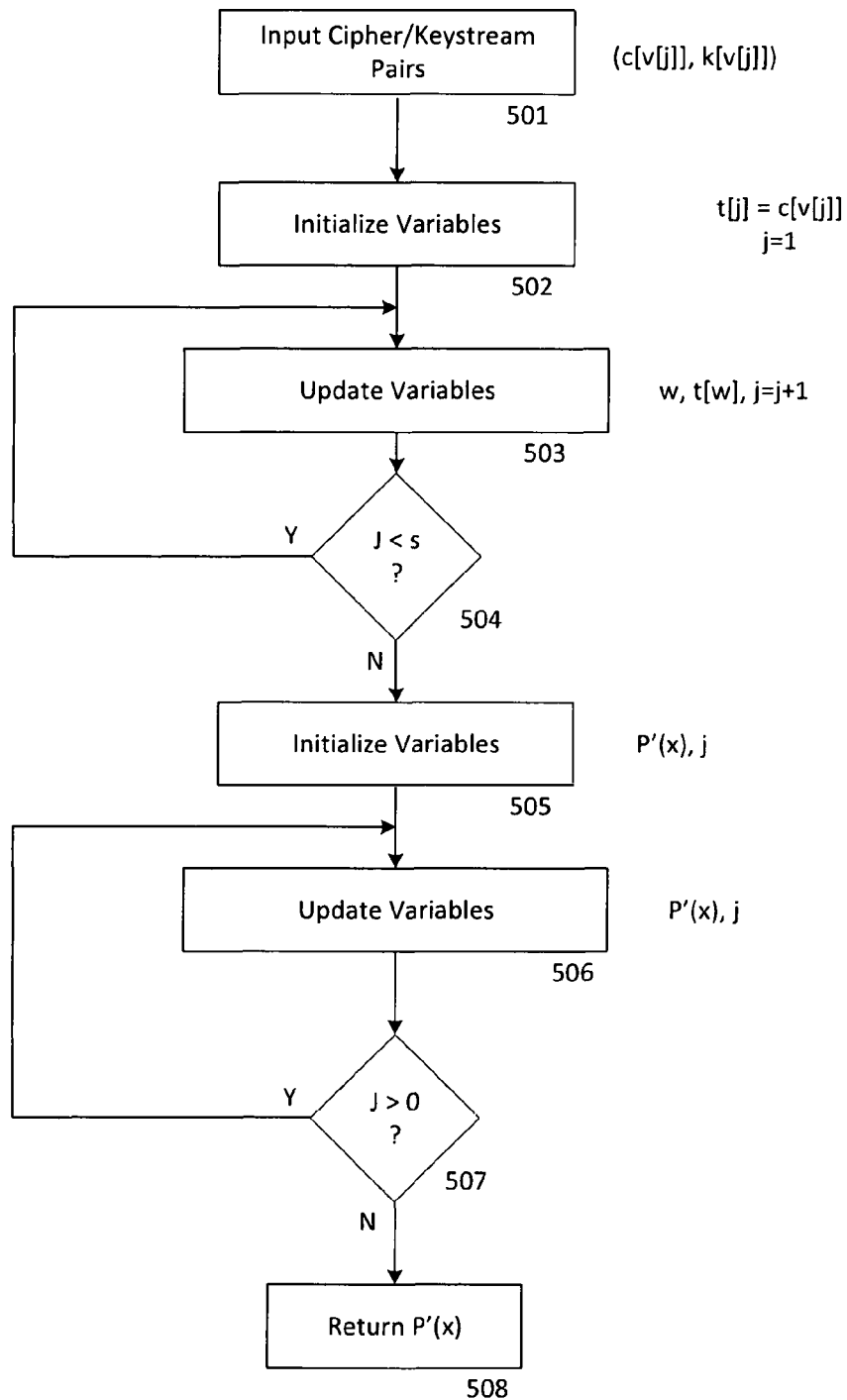
FIG. 5 shows iterative construction of a polynomial used in Da Yen processing.

FIG. 5 illustrates a first way to create P'(x), representing an iterative construction. At point 501, the cipher/keystream pairs are input, again including $c[v[j]], k[v[j]], j=0, 1, \ldots, (s-1)$, (c being the cipher and k the keystream). The value of v[j] is less than t and greater than or equal to zero, while the cipher/keystream pair is an element of $F_{2^n}$. At point 502, the system initializes variables, setting $t[j]=c[v[j]]$ for $j=0, 1, \ldots, (s-1)$, with j equal to 1. Variables are then updated as follows:

for $j=0, 1, \ldots, (s-2)$
for $w=j+1, j+2, \ldots, (s-1)$ $$t[w]=(t[w]\oplus t[j])(k[v[w]]\delta k[v[j]])^{-1} \qquad (9)$$

[$\oplus$ represents XOR (exclusive or)]

At point 504, the system evaluates if the counter j is less than s, with s representing the number of retrieved words of ciphertext. If so, the variables are again updated at point 503. If not, i.e. if the number of iterations is equal to or greater than the total number of retrieved ciphertext words, the system initializes a new set of variables at point 505 as follows:

$$P'(x)=t[s-1] \qquad (10)$$

$j=s-2$

At point 506, the system updates these variables as follows:

$$P'(x)=P'(x)(x\oplus k[v[j]])\oplus t[j] \qquad (11)$$

$j=j-1$

At point 507, the system evaluates whether j is greater than or equal to zero, and if so, repeats updating of variables at point 507. If false, P'(x) is returned, where P'(x) is as follows:

$$P'(x)=\Sigma_{j=0}^{s-1}p'[j]x^j \qquad (12)$$

$$p'[j]=p'_{j+1)n-1}p'_{(j+1)n-2} \ldots p'_{(jn+1)}p'_{jn} \qquad (13)$$

Figure 6:
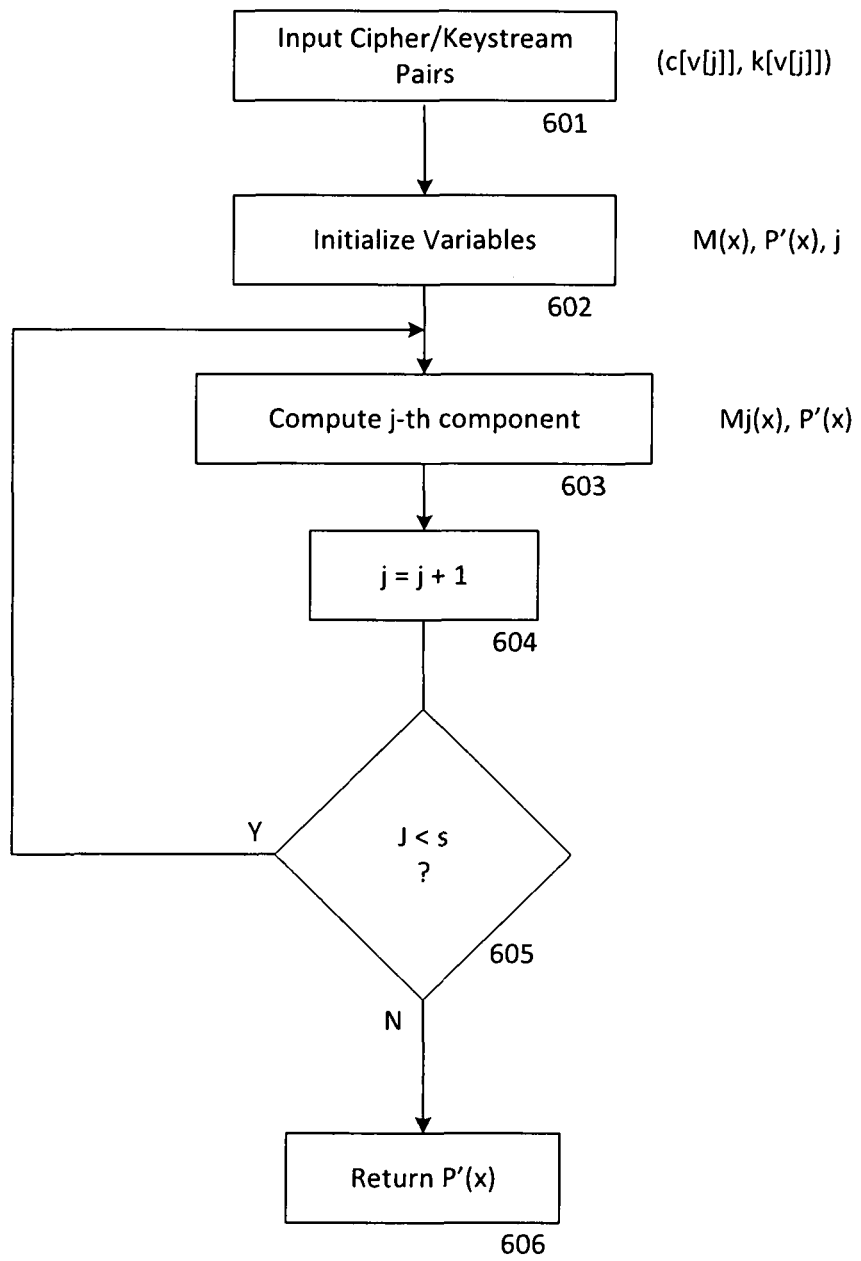
FIG. 6 is Da Yen encryption processing using big summation.

FIG. 6 shows an alternate method of computing P'(x), generally referred to as the big summation method. At point 601, the system receives the cipher/keystream pairs, again including $c[v[j]], k[v[j]], j=0, 1, \ldots, (s-1)$, (c being the cipher and k the keystream). v[j] is between 0 and t, and c[v[j]], k[v[j]] is an element of $F_{2^n}$. Variables are initialized at point 602, including variables M(x) (modulus), P'(x), and j, where:

$$M(x) = \Pi_{i=0}^{s-1}(x \oplus k[v[i]]) \quad (14)$$

$$P'(x) = 0$$

$$j = 0$$

At point 603, the system computes the j-th component as follows:

$$M_j(x) = \frac{M(x)}{(x \oplus k[v[j]])} \quad (15)$$

$$P'(x) = P'(x) \oplus M_j(x)(M_j(k[v[j]]))^{-1}c[v[j]]) \quad (16)$$

At point 604, the system increments j, and at point 605, evaluates whether j is less than s. If so, the system computes further components, but if false, the resultant value is P'(x), where again, $$P'(x) = \Sigma_{j=0}^{s-1} p'[j]x^j \quad (17)$$

$$p' = p'_{(j+1)n-1} p'_{(j+1)n-2} \ldots p'_{(jn+1)} p'_{jn} \quad (18)$$

The system also may perform error checking. If more than d cipher words are used, the degree of the resulting P'(x) should be less than d. If greater than or equal to d, an error has occurred. The high order r bits of the plaintext block is set to salt determined by the key stream. If the recovered high order r bits of the (d−1)-st term of P' are not equal to the appropriate key stream bits, an error has occurred.

Figure 7:
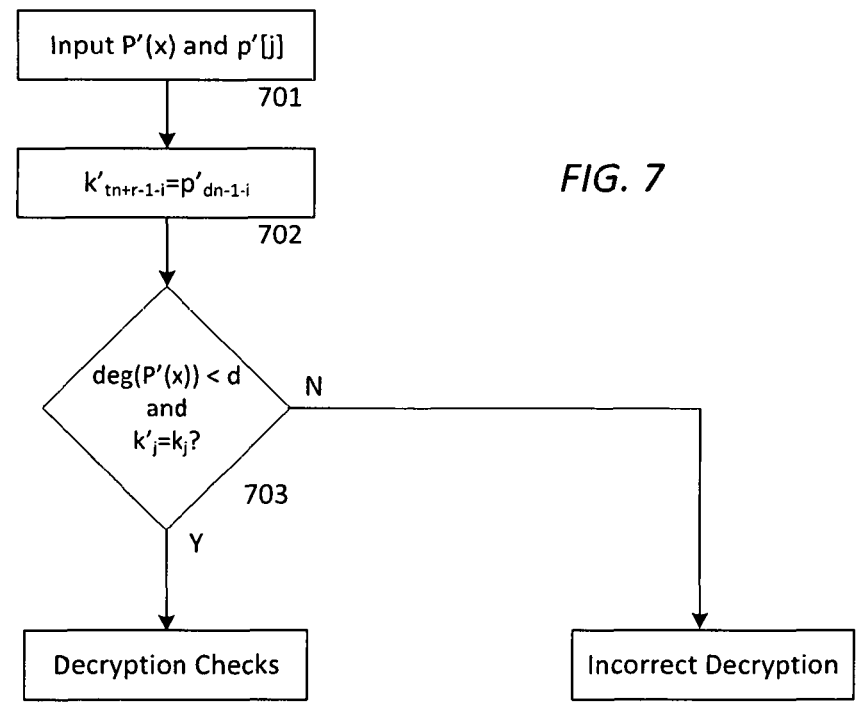
FIG. 7 illustrates error checking.

FIG. 7 shows this error checking. In FIG. 7, input is shown at point 701, where input is in the following form:

$$P'(x) = \Sigma_{j=0}^{s-1} p'[j]x^j \quad (19)$$

$$p'[j] = p'_{(j+1)n-1} p'_{(j+1)n-2} \ldots p'_{(jn+1)} p'_{jn} \quad (20)$$

At point 702, the system determines $k'_{m+r-1-i} = p'_{dn-1-i}$ for i=0, 1, . . . r−1. At point 703, the system makes the two aforementioned checks, i.e. the degree of P'(x) and the high order plaintext bits, and if both checks are satisfied, the system indicates decryption occurred successfully, but if not, the decryption is incorrect.

Error correction may occur. Single point error correction is contemplated; multiple point error correction is similar but more costly. The system corrects errors by first creating the full recovered polynomial P' including errors. Reducing this polynomial modulo various subsets of the full modulus, for example all but one:

$$M'_j(x) = \Pi_{i=0, \ne j}^{(s-1)}(x \oplus k[v[j]]) \quad (21)$$

returns a smaller polynomial, one that only uses the subset of key stream values. Assuming s is greater than d, a polynomial:

$$P'_h(x) = P'(x) \bmod M_j(x) \quad (22)$$

which passes the error checks is a correct decrypted value. Too many errors or too few cipher words may result in unrecoverable data.

Figure 8:
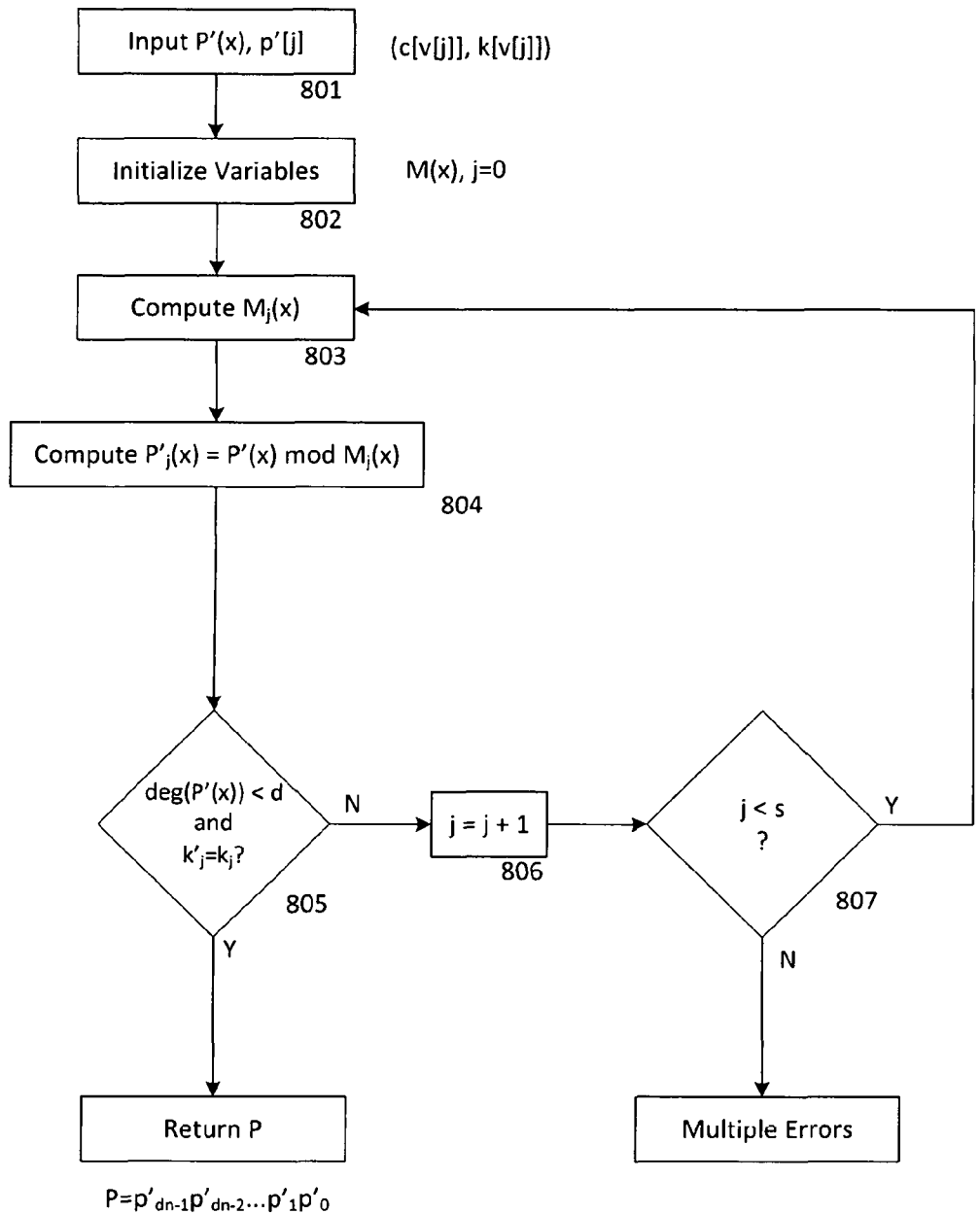
FIG. 8 shows one aspect of error correction.

A generalization of single point error conversion is presented in FIG. 8. At point 801, the values P'(x) and p'[j] are input, where:

$$P'(x) = \Sigma_{j=0}^{s-1} p'[j]x^j \quad (23)$$

$$p'[j] = p'_{n(j+1)-1} \ldots p'_{nj+2} p'_{nj+1} p_{nj} \quad (24)$$

At point 802, the system initializes variables M(x) and j, where:

$$M(x) = \Pi_{i=0}^{s-1}(x \oplus k[v[i]]) \quad (25)$$

$$j = 0$$

At point 803, the system computes $M_j(x)$ as follows:

$$M_j(x) = \frac{M(x)}{(x \oplus k[v[j]])} \quad (26)$$

At point 804, the system computes $P'_j(x)$ as:

$$P'_j(x) = P'(x) \bmod M_j(x) \quad (27)$$

At point 805, the system determines whether the degree of $P'_j(x)$ is less than d and $k_i'$ is equal to $k_i$, specifically:

$$\deg(P'_j(x)) < d \text{ and}$$

$$k_i' = k_i$$

for $tn \le i < tn+r$

If both are true, then P is returned, where:

$$P = p'_{dn-1} p'_{dn-2} \ldots p'_1 p'_0 \quad (28)$$

If both are not true, i.e. one or both are false, the system increments j at point 806, and evaluates at point 807 whether j is less than s. If so, the system cycles back to point 803, but if false multiple errors exist, the error checking terminates.

Figure 9:
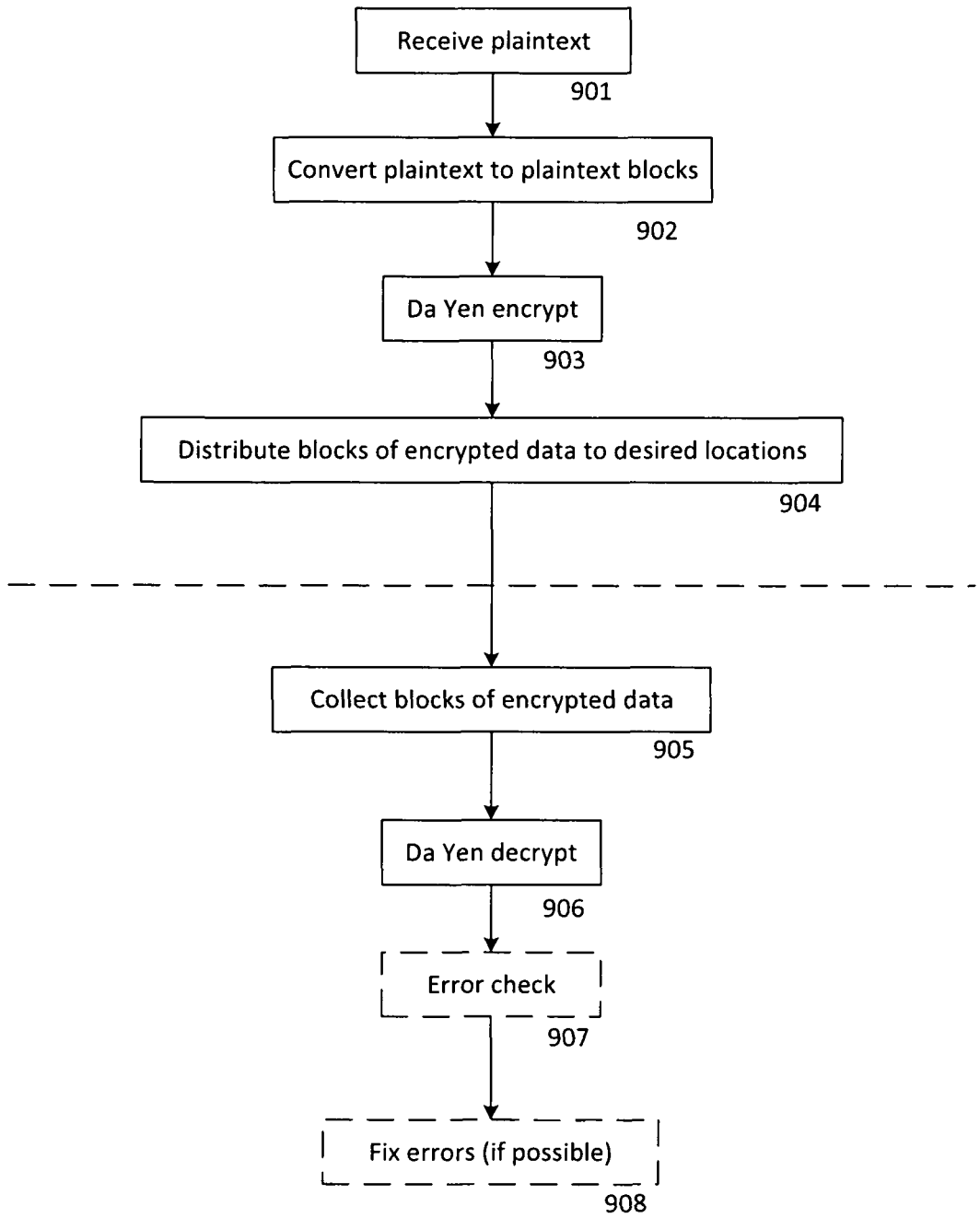
FIG. 9 is a general overview of the functionality of the present design.

FIG. 9 illustrates a general overall representation of the design presented. At point 901, the system receives plaintext. At point 902, the system converts plaintext into plaintext blocks, providing both plaintext blocks and a cryptovariable. At point 903, the system processes the plaintext blocks and the cryptovariable into encrypted blocks using the Da Yen processing described herein, including creating the polynomial adding a key word to the polynomial, etc. Once encrypted, the present design at point 904 distributes the encrypted data to the desired locations, such as various locations within the network. "Various locations" indicates the design may distribute the encrypted data to a single device but at various registers on the device, or may employ multiple devices. Further, the computer network may include any type of network, public or private, wired or wireless, and may be the entire Internet. At point 905, decryption is desired, and a processing device collects or retrieves encrypted data from various locations in the computer network. At point 906, the system decrypts the encrypted data using the Da Yen processing described herein. At point 907, the system performs an error check, which is optional, and at point 908 the system fixes errors if possible, and such functionality is also optional.

Da Yen Example

To expand on the foregoing, the Da Yen is an isomorphism between a factor ring and a direct product of factor rings. Generally this implies the integers modulo m or the polynomials over a field modulo m(x). As an example, the Da Yen isomorphism for fifteen maps the integers modulo fifteen to the integers modulo three and modulo five is as follows:

TABLE 1

| | Z/15Z ≅ Z/3Z × Z/5Z | | | | | | | | | | | | | | |
|---|---|---|---|---|---|---|---|---|---|---|---|---|---|---|---|
| mod15 | 0 | 1 | 2 | 3 | 4 | 5 | 6 | 7 | 8 | 9 | 10 | 11 | 12 | 13 | 14 |
| mod3 | 0 | 1 | 2 | 0 | 1 | 2 | 0 | 1 | 2 | 0 | 1 | 2 | 0 | 1 | 2 |
| mod5 | 0 | 1 | 2 | 3 | 4 | 0 | 1 | 2 | 3 | 4 | 0 | 1 | 2 | 3 | 4 |

Operations are equivalent whether they are performed modulo fifteen or modulo three and five. Adding 13+11 mod 15 is identical to adding the pairs (1 mod 3, 3 mod 5)+(2 mod 3, 1 mod 5); multiplying 8·10 mod 15 is equivalent to multiplying the pairs (2 mod 3, 3 mod 5). (1 mod 3, 0 mod 5):

9 mod 15≅(1+2≡0 mod 3, 3+1≡4 mod 5)

5 mod 15≅(2 mod 3, 0 mod 5)

The system is inherently homomorphic over the factor ring:

$$F_q[x]/(\Pi_{i=0}^{t-1}(x-k_i))F_q[x] \sim \Pi_{i=0}^{t-1} F_q[x]/(x-k_i)F_q[x] \quad (29)$$

Encryption Example

The simplified stream cipher (key generator) used is as follows. The initial seed key is 3 mod 17 and the cryptovariable, v, is an odd integer modulo 16. The initial key word is $k_0 \equiv 3^v$ mod 17; subsequent key words are $k_j \equiv k_0^{j+1}$ mod 17. Each block of plaintext is four words long in $F_{17}$ and five blocks of ciphertext (also in $F_{17}$) are generated (expansion rate of 2:3). The system generates key stream words to encipher four blocks of plaintext as follows:

TABLE 2

| | Key Words | | | | | | | |
|---|---|---|---|---|---|---|---|---|
| Block j | $v_j$ | $k_0$ | $k_1$ | $k_2$ | $k_3$ | $k_4$ | $k_5$ | $k_6$ |
| 0 | 7 | 11 | 2 | 5 | 4 | 10 | 8 | 3 |
| 1 | 3 | 10 | 15 | 14 | 4 | 6 | 9 | 5 |
| 2 | 9 | 14 | 9 | 7 | 13 | 12 | 15 | 6 |
| 3 | 5 | 5 | 8 | 6 | 13 | 14 | 2 | 10 |

The plaintext block $[u_3\ u_2\ u_1\ u_0]$ represents the polynomial $A(x) = \sum_{i=0}^{3} u_i x^i$ over $F_{17}$.

Plaintext $P0=[7\ 10\ 13\ 5]$ $P1=[8\ 12\ 9\ 4]$ $P2=[1\ 1\ 1\ 1]$ $P3=[0\ 0\ 0\ 0]$ The key word $k_6$ is then added to form the plaintext polynomials:

Plaintext plus Key Term $P_0 = 3x^4 + 7x^3 + 10x^2 + 13x + 5$ $P_1 = 5x^4 + 8x^3 + 12x^2 + 9x + 4$ $P_2 = 6x^4 + 1x^3 + 1x^2 + 1x + 1$ $P_3 = 10x^4 + 0x^3 + 0x^2 + 0x + 0$ To encrypt, the system evaluates each polynomial $P_i(x)$ at the ith keyword.

The following table gives the cryptovariable $v_j$ for blocks j=0, 1, 2, 3, the subsequent key streams for each block, and the ciphertext words obtained by evaluating the plaintext block/polynomial at the given key stream modulo 17:

TABLE 3

| Block j | $v_j$ | $k_1$ | $w_1$ | $k_2$ | $w_2$ | $k_3$ | $w_3$ | $k_4$ | $w_4$ | $k_5$ | $w_5$ |
|---|---|---|---|---|---|---|---|---|---|---|---|
| 0 | 7 | 2 | 5 | 5 | 10 | 4 | 5 | 10 | 4 | 8 | 12 |
| 1 | 3 | 15 | 16 | 14 | 2 | 4 | 1 | 6 | 11 | 9 | 16 |
| 2 | 9 | 9 | 15 | 7 | 16 | 13 | 6 | 12 | 8 | 15 | 6 |
| 3 | 5 | 8 | 7 | 6 | 6 | 13 | 10 | 14 | 11 | 2 | 7 |

The system then extracts only the ciphertext words, giving the transmitted or stored data:

TABLE 4

| | Encrypted Data | | | | |
|---|---|---|---|---|---|
| | | | word | | |
| block | 1 | 2 | 3 | 4 | 5 |
| 0 | 5 | 10 | 5 | 4 | 12 |
| 1 | 16 | 2 | 1 | 11 | 16 |
| 2 | 15 | 16 | 6 | 8 | 6 |
| 3 | 7 | 6 | 10 | 11 | 7 |

To decrypt a block, the system gathers any four words in this example of the ciphertext, recomputes the key words, and constructs the plaintext using the large summation version of the Da Yen.

$$\begin{aligned}
P_2(x) &\equiv (x-7)(x-13)(x-12)(x-15) \\
&\quad [(2*13*14*11)^{-1}15] + \\
&\quad (x-9)(x-13)(x-12)(x-15) \\
&\quad [(15*11*12*9)^{-1}16] + \\
&\quad (x-9)(x-7)(x-12)(x-15) \\
&\quad [(4*6*1*15)^{-1}6] + \\
&\quad (x-9)(x-7)(x-13)(x-15) \\
&\quad [(3*5*16*14)^{-1}8] + \\
&\quad (x-9)(x-7)(x-13)(x-12) \\
&\quad [(6*8*2*3)^{-1}6] \\
&\equiv 13x^4 + 1x^3 + 3x^2 + 3x + 15 + \\
&\quad 4x^4 + 8x^3 + 11x^2 + 16x + 5 + \\
&\quad 2x^4 + 16x^3 + 7x^2 + 1x + 2 + \\
&\quad 10x^4 + 2x^3 + 5x^2 + 1x + 8 + \\
&\quad 11x^4 + 8x^3 + 9x^2 + 14x + 5 \\
&\equiv 6x^4 + 1x^3 + 1x^2 + 1x + 1
\end{aligned}$$

Thus according to the present design, there is provided a method for distributing data to a plurality of storage locations in a computing network. The method includes receiving, at a processor in the computing network, input data and an input random cryptovariable, transforming, at the processor, the input data and the input random cryptovariable into encrypted output using Da Yen processing, and distributing the encrypted output to the plurality of storage locations. Input data may be received as a plurality of blocks of plaintext and the encrypted output is ciphertext. Da Yen processing includes representing the input data as a polynomial, adding a key word to the polynomial, and evaluating the polynomial at an ith key word. The polynomial is a modulus, wherein the modulus is a degree one monic polynomial.

Da Yen processing results in mathematical operations performed on the encrypted data being homomorphically equivalent to the mathematical operations performed on the input data. A subset of less than d cipher words is not decryptable using the input cryptovariable. Da Yen processing may include using a stream cipher to generate a plurality of key words, using a first nonzero byte of one key word as a higher order byte of a (d−1)th plaintext coefficient, and filling a lower order portion of the one key word with plaintext. Da Yen processing may include iterative construction or summation of a polynomial based on the input data and the input random cryptovariable.

Alternately, the present design may be considered to include an apparatus for distributing data to a plurality of storage locations in a computing network. The apparatus includes a processor configured to receive input data and an input random cryptovariable and transform the input data and the input random cryptovariable into encrypted output using Da Yen processing. The apparatus further includes a transmitter configured to receive the encrypted output and distribute the encrypted output to the plurality of storage locations.

The present design may also include a method for decrypting encrypted blocks of data distributed over a plurality of storage locations in a computing network. The method includes receiving, at a processor in the computing network, a plurality of cipher/key word pairs, and transforming, at the processor, the plurality of cipher/key word pairs and a salt key word into plaintext using Da Yen processing.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A computing network system, comprising:
   a plurality of storage locations; and
   a Da Yen processor configured to receive input data and an input random cryptovariable;
   wherein the Da Yen processor is further configured to transform the input data and the input random cryptovariable into encrypted output using Da Yen processing and distribute the encrypted output to the plurality of storage locations;
   wherein Da Yen processing comprises:
      using a stream cipher to generate a plurality of key words;
      using a first nonzero byte of one key word as a higher order byte of a dth plaintext coefficient; and
      filling a lower order portion of the one key word.

2. The computing network system of claim 1, wherein the input data is received as a plurality of blocks of plaintext and the encrypted output is ciphertext.

3. The computing network system of claim 1, wherein Da Yen processing further comprises:
   representing the input data as a polynomial;
   adding a key word to the polynomial; and
   evaluating the polynomial at the ith key word.

4. The computing network system of claim 3, wherein the polynomial is a modulus, wherein the modulus is a degree one monic polynomial.

5. The computing network system of claim 1, wherein Da Yen processing results in mathematical operations performed on the encrypted data being homomorphically equivalent to the mathematical operations performed on the input data.

6. The computing network system of claim 1, wherein a subset of less than d cipher words is not deccryptable using the input random cryptovariable.

7. The computing network system of claim 1, wherein Da Yen processing comprises
   filling the lower order portion of the one key word with plaintext.

8. The computing network system of claim 1, wherein Da Yen processing comprises iterative construction of a polynomial based on the input data and the input random cryptovariable.

9. The method of claim 1, wherein Da Yen processing comprises summation of a polynomial based on the input data and the input random cryptovariable.

10. A computer processing apparatus comprising:
    a plurality of storage locations;
    a Da Yen processor configured to:
       receive input data and an input random cryptovariable; and
       transform the input data and the input random cryptovariable into encrypted output using Da Yen processing; and a transmitter configured to receive the encrypted output and distribute the encrypted output to the plurality of storage locations;

wherein Da Yen processing comprises:
using a stream cipher to generate a plurality of key words;
using a first nonzero byte of one key word as a higher order byte of a dth plaintext coefficient; and
filling a lower order portion of the one key word.

11. The computer processing apparatus of claim 10, wherein the input data is received as a plurality of blocks of plaintext and the encrypted output is ciphertext.

12. The computer processing apparatus of claim 10, wherein Da Yen processing further comprises:
representing the input data as a polynomial;
adding a key word to the polynomial; and
evaluating the polynomial at an ith key word.

13. The computer processing apparatus of claim 12, wherein the polynomial is a modulus, wherein the modulus is a degree one monic polynomial.

14. The computer processing apparatus of claim 10, wherein Da Yen processing results in mathematical ring operations performed on the encrypted data being homomorphically equivalent to the mathematical ring operations performed on the input data.

15. The computer processing apparatus of claim 10, wherein a subset of the encrypted output data is not decryptable using the input random cryptovariable.

16. The computer processing apparatus of claim 10, wherein Da Yen processing comprises
filling the lower order portion of the one key word with plaintext.

17. The computer processing apparatus of claim 10, wherein Da Yen processing further comprises iterative construction of a polynomial based on the input data and the input random cryptovariable.

18. The computer processing apparatus of claim 10, wherein Da Yen processing comprises summation of a polynomial based on the input data and the input random cryptovariable.

19. A system comprising:
a plurality of storage locations in a computing network;
a Da Yen decryption processor configured to receive a plurality of cipher/keyword pairs from the plurality of storage locations in the computing network and transform the plurality of cipher/keyword pairs and a salt key word into plaintext using Da Yen decryption processing;
wherein Da Yen decryption processing comprises:
gathering multiple words of ciphertext from the multiple storage locations;
recomputing key words based on the multiple words of ciphertext; and
constructing plaintext by performing a summation function on the recomputed keywords.

20. The system of claim 19, wherein a subset of d or more cipher/key word pairs is usable by the processor to decrypt the encrypted blocks of data.

21. The system of claim 20, wherein fewer than d cipher/key word pairs reveals no bit of plain text data.

22. The system of claim 19, further comprising:
checking for errors; and
attempting to correct errors discovered.

* * * * *